UNITED STATES PATENT OFFICE 2,111,866

CHLORINATION OF BENZENE

Joseph R. Mares, St. Louis, Mo., assignor to Monsanto Chemical Company, St. Louis, Mo., a corporation of Delaware No Drawing. Application September 21, 1934, Serial No. 744,919

3 Claims. (Cl. 260—161)

This invention relates to the chlorination of benzene and it deals specifically with a catalytic chlorination whereby many objectionable features of present day technical chlorination processes are obviated.

Chlorbenzene is made on a technical scale by causing benzene to contact with elemental chlorine as by bubbling gaseous chlorine through liquid benzene. The desired reaction may be represented as follows:

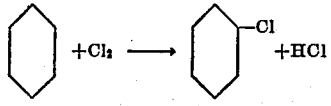

For the purpose of facilitating the reaction it is customary to add ferric chloride in an amount generally not exceeding 1% and usually much less than 1% of the benzene being chlorinated. It is well known that when chlorbenzene is brought into contact with chlorine, di and poly chlorbenzenes are formed. The chlorination reaction proceeds smoothly even in the absence of a catalyst such as ferric chloride; in fact, one can remove small amounts of chlorine from a gas mixture by bubbling it through a chlorinated benzene mixture even though the mixture contains but little catalyst. In view of the foregoing it will be evident that the interaction of chlorine and benzene results in several possible products, only one of which may be desired, as, for example, when only monochlorbenzene is required. It will likewise be evident that the formation of the undesired higher chlorinated bodies takes place readily under the conditions employed now for monochlor benzene formation.

It is common practice today, when di and poly chlorbenzenes are to be avoided, to underchlorinate, that is, to stop the reaction well before all of the benzene has reacted with chlorine. To illustrate, if chlorine were to be introduced into benzene until all but 2% of the benzene had reacted, 50% of the resulting mixture would be di and poly chlorbenzene. On the other hand, if the chlorination be interrupted when approximately half the benzene remains unreacted there will be present 45% monochlorbenzene and 4% or 5% of di and poly chlorbenzenes. The underchlorination procedure has the disadvantage of necessitating recycling of the benzene which reduces the output and increases the cost of the final product. Furthermore before the chlorinated mixture is fractionated it must be washed with water and carefully neutralized by the addition of a small amount of soda ash. The catalyst thus removed is lost and fresh catalyst must be added to the benzene fraction, care being exercised that the benzene shall first have been dried carefully to avoid the possibility of corrosion.

The present invention avoids not only the objectionable features incident to the recycling of benzene but minimizes the necessity of such recycling whereby it is possible to obtain 75%–80% or even more of monochlorbenzene, the remainder being dichlorbenzenes with substantially no higher chlorbenzenes or unreacted benzene. Finally, the invention enables one to use the present day equipment and operate under conditions of temperature, etc. comparable with those which are now employed.

I have found that stannic chloride exerts an unexpected catalytic action favoring monochlor formation of benzene which is effective at ordinary temperatures of chlorination such as are now employed. By means of this reagent one can chlorinate a batch of benzene practically completely or until not more than one or two per cent of benzene remains unreacted while at the same time obtaining in the neighborhood of only 20% or less of dichlorbenzenes and an almost negligible amount of higher chlorinated bodies. Obviously if greater proportions of dichlorbenzenes are required they may be formed by continued chlorination. I have also found that the ratio of ortho to para dichlorbenzenes is not less favorable to the para formation than the best reported catalysts of today. Inasmuch as the para dichlorbenzene is the more valuable of the two dichlorbenzenes formed, no disadvantage results from the use of the new reagent.

In addition to the fact that the stannic chloride affords definite advantages in that it enables one to get a higher percentage of monochlorbenzene without obtaining correspondingly large amounts of dichlorbenzene, my process affords other advantages with respect to the working up or refining of the reacted mixture. Thus, whereas ferric chloride cannot be eliminated from a still by distillation but remains in the distillation equipment unless first removed (as by washing the reacted mixture with water), the stannic chloride is volatile and readily separable by fractional distillation from either benzene or the products of chlorination. Thus, stannic chloride boils at atmospheric pressure at approximately 113°–114° C. and if one desired, can be cut from both the benzene which boils at 78° C. and the monochlorbenzene which boils at about 130° C. For most purposes, however, it is sufficient to make a rough cut after the temperature of the vapors has reached 130° C. whereby all of the benzene, stannic chloride and only a small amount of monochlorbenzene is distilled. The first cut is then returned to the chlorinating vessel together with additional benzene. The benzene should be dry to avoid corrosion and decomposition of the stannic chloride.

The amount of stannic chloride employed may vary widely, although for most purposes 1% or 2% will be found sufficient. To start the chlorination one may, if desired, add elemental tin, preferably in pulverulent form, which will combine with the chlorine that is dissolved by the benzene to form stannic chloride, in situ. The stannic chloride may be returned and used repeatedly. If desired, the chlorination may be effected in series or in cascade fashion by passing the gas containing the chlorine through several interconnected vessels filled or partly filled with the reacting mixture. Preferably, the fresh or pure chlorine passes first into benzene, after which the partially spent gas is conducted into contact with a partly chlorinated benzene mixture. If desired, the reverse order may be employed, that is, the fresh chlorine is passed countercurrently with respect to the benzene undergoing chlorination. The former procedure is, however, for most purposes, preferable. The temperature of chlorination may vary, although a temperature range of 30° C.–40° C. will be found convenient and practicable. Ordinary cooling water may be used to attain temperature control.

One of the distinct advantages of the present invention resides in the ease with which the process may be operated continuously, not only as to the chlorination step but also as to the steps of fractionation and recovery of the final products. This is made possible by the fact that the catalyst, together with unreacted benzene, may be removed from the chlorinated product easily by fractionation. The distillate recovered may then be conveyed continuously or otherwise to a second fractionating unit where the monochlorbenzene is separated from the dichlorbenzene, and finally the dichlorbenzene fraction may be distilled to remove any higher chlorinated bodies.

From the foregoing description it will be evident that the present invention enables one to enjoy a degree of continuity and greater flexibility in the production of monochlorbenzene and dichlorbenzene than has been possible heretofore, and that the dichlorbenzene may be restricted to practically negligible proportions by purposely underchlorinating a benzene mixture and that even when a mixture is chlorinated to the point where only one or two per cent of the benzene remains the amount of dichlorbenzene formation is relatively small as compared to the amounts obtainable by present day catalysts.

What I claim is:

1. A method of selectively chlorinating benzene to favor the formation of monochlorbenzene which comprises passing chlorine gas into benzene in the presence of stannic chloride and discontinuing the flow of chlorine when approximately 75–80% of the benzene is converted into monochlorbenzene and 20–25% of the benzene is converted into dichlorbenzene.

2. The method of claim 1 in which the reaction products are subsequently subjected to fractional distillation to separate the stannic chloride and the benzene chlorides are recovered in a substantially pure state.

3. The method of claim 1 in which the amount of stannic chloride is not substantially in excess of 2% of the weight of the benzene.

JOSEPH R. MARES.